United States Patent
Matsunaga et al.

(10) Patent No.: US 9,896,603 B2
(45) Date of Patent: Feb. 20, 2018

(54) CURING ACCELERATOR FOR OXIDATIVE POLYMERIZATION-TYPE UNSATURATED RESIN, PRINTING INK, AND COATING MATERIAL

(71) Applicant: DIC Corporation, Tokyo (JP)

(72) Inventors: Shigeki Matsunaga, Ichihara (JP); Akinori Takahashi, Ichihara (JP); Hitoshi Hayakawa, Ichihara (JP)

(73) Assignee: DIC Corporation, Tokyo (JP)

( * ) Notice: Subject to any disclaimer, the term of this patent is extended or adjusted under 35 U.S.C. 154(b) by 76 days.

(21) Appl. No.: 14/903,774

(22) PCT Filed: Jun. 26, 2014

(86) PCT No.: PCT/JP2014/066978
§ 371 (c)(1),
(2) Date: Jan. 8, 2016

(87) PCT Pub. No.: WO2015/005121
PCT Pub. Date: Jan. 15, 2015

(65) Prior Publication Data
US 2016/0152867 A1 Jun. 2, 2016

(30) Foreign Application Priority Data

Jul. 8, 2013 (JP) ................................. 2013-142590

(51) Int. Cl.
| | |
|---|---|
| C09D 7/12 | (2006.01) |
| C09D 11/105 | (2014.01) |
| C09D 167/08 | (2006.01) |
| C08L 67/06 | (2006.01) |
| C09F 9/00 | (2006.01) |
| C09D 11/03 | (2014.01) |

(52) U.S. Cl.
CPC .............. *C09F 9/00* (2013.01); *C09D 7/1233* (2013.01); *C09D 11/03* (2013.01); *C09D 11/105* (2013.01); *C09D 167/08* (2013.01)

(58) Field of Classification Search
None
See application file for complete search history.

(56) References Cited

U.S. PATENT DOCUMENTS

| | | |
|---|---|---|
| 2,565,897 A | 8/1951 | Wheeler |
| 2,852,405 A | 9/1958 | Myers et al. |
| 6,344,516 B1 | 2/2002 | Ikeda et al. |
| 2002/0013427 A1* | 1/2002 | Tsuji ................. C08G 65/2663 525/523 |

FOREIGN PATENT DOCUMENTS

| | | |
|---|---|---|
| JP | 06-172689 A | 6/1994 |
| WO | WO-2001/000702 A1 | 1/2001 |
| WO | 03/029371 A1 | 4/2003 |
| WO | WO-2011/158694 A1 | 12/2011 |
| WO | WO-2013/077267 A1 | 5/2013 |
| WO | WO-2013/084823 A1 | 6/2013 |
| WO | WO-2013/084824 A1 | 6/2013 |

OTHER PUBLICATIONS

English abstract of JP 09286854 A, Nov. 4, 1997, Japan, 3 pages.*
International Search Report dated Sep. 30, 2014, issued for PCT/JP2014/066978.
Remy van Gorkum et al., "The oxidative drying of alkyd paint catalysed by metal complexes", Coordination Chemistry Reviews, vol. 249, No. 17-18, Mar. 3, 2005, pp. 1709-1728.(cited in the Feb. 3, 2017 Search Report).
Supplementary Search Report dated Feb. 3, 2017, issued for the European patent application No. 14823600.3.

* cited by examiner

*Primary Examiner* — Tae H Yoon
(74) *Attorney, Agent, or Firm* — Locke Lord LLP

(57) ABSTRACT

There is provided a highly versatile curing accelerator for an oxidative polymerization-type unsaturated resin. There are also provided a printing ink and a coating material that use the above curing accelerator. Specifically, the curing accelerator for an oxidative polymerization-type unsaturated resin that is used contains a fatty acid manganese salt (A) and a compound (B) represented by formula (1) below,

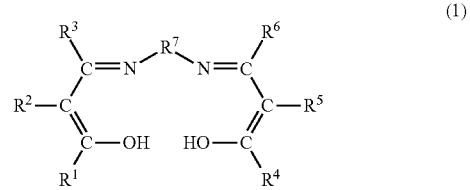

(1)

(wherein $R^1$ and $R^4$ are each a hydrogen atom, a hydrocarbon group, a hydrocarbonoxy group, or an amino group, $R^2$ and $R^5$ are each a hydrogen atom, a hydrocarbon group, a hydrocarbonoxy group, a hydrocarbonoxycarbonyl group, a cyano group, a nitro group, or a halogen atom, $R^3$ and $R^6$ are each a hydrogen atom or a hydrocarbon group, and $R^7$ is a divalent hydrocarbon group, and wherein $R^1$ and $R^2$ may form a ring, and $R^4$ and $R^5$ may form a ring).

23 Claims, No Drawings

CURING ACCELERATOR FOR OXIDATIVE POLYMERIZATION-TYPE UNSATURATED RESIN, PRINTING INK, AND COATING MATERIAL

This application is a National Stage Entry of PCT/JP2014/066978 filed Jun. 26, 2014, and claims the right of priority under 35 U.S.C. § 365(b) based on Japanese Patent Application No. 2013-142590 filed Jul. 8, 2013, which is hereby incorporated by reference herein in its entirety as if fully set forth herein.

TECHNICAL FIELD

The present invention relates to a curing accelerator that can impart superior curability to an oxidative polymerization-type unsaturated resin and relates to a printing ink and a coating material that use the curing accelerator.

BACKGROUND ART

In the field of printing inks, coating materials, etc. in which an oxidative polymerization-type resin is used as a constituent, a dryer is added as a curing accelerator for drying the resin. Metal salts of heavy metals such as cobalt, manganese, lead, iron, and zinc and various carboxylic acids (hereinafter these metal salts may be abbreviated as "metallic soaps") are generally used as the dryers for these inks and coating materials.

Particularly, cobalt metallic soaps have excellent drying performance. However, when a large amount of cobalt metallic soap is used in order to obtain further improved drying performance, surface drying of an ink or a coating film proceeds at a very high rate, and this causes a problem in that wrinkling and shrinkage occur. One method proposed to obtain high drying performance while the occurrence of wrinkling and shrinkage is prevented is to use a curing accelerator that uses a combination of a cobalt metallic soap and bipyridyl (see, for example, PTL 1). This curing accelerator can prevent the occurrence of wrinkling and shrinkage and has high drying performance.

However, cobalt compounds have been listed in Group 2B "Possibly carcinogenic to humans" in the list of carcinogenic risks by the International Agency for Research on Cancer and are therefore feared to be carcinogenic. In addition, since metallic cobalt is a rare metal and its supply is unstable, cobalt metallic soaps have a high cost. There is therefore a demand for a curing accelerator that has high drying performance with a reduced amount of cobalt metallic soap used or with no cobalt metallic soap used.

As a method of preventing wrinkling and shrinkage without the use of a cobalt metallic soap, a drying accelerator (a curing accelerator) that uses a combination of a manganese metallic soap and bipyridyl has already been proposed prior to the disclosure of PTL 1 (see, for example, PTL 2). Although the drying accelerator described in PTL 2 has an advantage in that no cobalt metallic soap is used, a problem with the drying accelerator when it is used for a printing ink or a coating material is that drying time is long.

A combination of a fatty acid manganese salt and a specific amino alcohol has been provided as a curing accelerator that can be used with a practical drying time (see, for example, PTL 3 to PTL 6). However, curability comparable to that of cobalt metallic soaps has not been obtained.

One method provided for an oxidative polymerization-type compound containing a vegetable oil is to use a complex composed of a specific tetradentate ligand compound and a metal as a curing catalyst (see, for example, PTL 7). However, the above vegetable oil is limited to a vegetable oil containing 50% or more of phenol compounds such as anacardic acid, anagigantic acid, pelandjauic acid, ginkgoic acid, ginkgolic acid, cardanol, cardol, methyl cardol, urushiol, thitsiol, rhengol, and laccol, and one example of such a vegetable oil is a cashew nut shell liquid obtained from *Anacardium occidentale*. Specifically, the curing reaction using the above complex is a radical coupling reaction of phenoxy radicals formed by dehydrogenation of the phenol compounds, and therefore the above complex cannot be used for a system containing no phenolic compounds. In addition, since the complex is poorly soluble in organic solvents, it is difficult to extend the use of the above complex to general-purpose ink and coating material compositions. It is stated that the complex may be formed within a curing reaction system to perform the reaction. However, in this case, materials that are difficult to handle outdoors, such as aqueous hydrogen peroxide and ethylenediamine, must be used in the system, so that the versatility of the above complex is low.

CITATION LIST

Patent Literature

PTL 1: Japanese Unexamined Patent Application Publication No. 06-172689
PTL 2: U.S. Pat. No. 2,565,897
PTL 3: International Publication No. 2011/158694
PTL 4: International Publication No. 2013/077267
PTL 5: International Publication No. 2013/084823
PTL 6: International Publication No. 2013/084824
PTL 7: International Publication No. 2001/000702

SUMMARY OF INVENTION

Technical Problem

An object of the present invention is to provide a highly versatile curing accelerator for an oxidative polymerization-type unsaturated resin that is highly soluble in organic solvents, can be used outdoors, and has a curing performance equal to or higher than the high curing performance of cobalt metallic soaps, which are feared to have an influence on the human body, without the use of any cobalt metallic soap and also to provide a printing ink and a coating material that use the above curing accelerator.

Solution to Problem

The present inventors have conducted extensive studies and found that the above object can be achieved by using a mixture of a fatty acid manganese salt, which is a non-cobalt-based fatty acid metal salt, and a salen-based compound represented by general formula (1) below. Thus, the present invention has been completed.

Accordingly, the present invention provides a curing accelerator for an oxidative polymerization-type unsaturated resin, the curing accelerator containing a fatty acid manganese salt (A) and a compound (B) represented by general formula (1) below,

[Chem. 1]

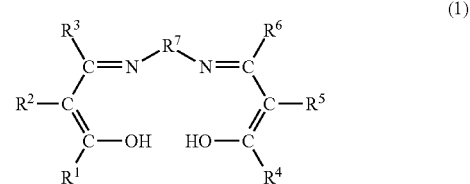

(wherein $R^1$ and $R^4$ each independently represent a hydrogen atom, a hydrocarbon group, a substituted hydrocarbon group, a hydrocarbonoxy group, a substituted hydrocarbonoxy group, an amino group, or a substituted amino group, $R^2$ and $R^5$ each independently represent a hydrogen atom, a hydrocarbon group, a substituted hydrocarbon group, a hydrocarbonoxy group, a substituted hydrocarbonoxy group, a hydrocarbonoxycarbonyl group, a substituted hydrocarbonoxycarbonyl group, a cyano group, a nitro group, or a halogen atom, $R^3$ and $R^6$ each independently represent a hydrogen atom, a hydrocarbon group, or a substituted hydrocarbon group, and $R^7$ represents a divalent hydrocarbon group or a substituted divalent hydrocarbon group, and wherein $R^1$ and $R^2$ may form a ring, and $R^4$ and $R^5$ may form a ring).

The present invention also provides a printing ink and a coating material that contain an oxidative polymerization-type unsaturated resin and the above-described curing accelerator for the oxidative polymerization-type unsaturated resin.

Advantageous Effects of Invention

The curing accelerator for an oxidative polymerization-type unsaturated resin according to the present invention addresses the concern about carcinogenicity of metal cobalt and the problem of unstable supply and high cost of the raw material, allows a short curing time, and has high curing performance. The curing accelerator is highly soluble in general-purpose organic solvents, can be used outdoors, and can be preferably used as a curing accelerator for oxidative polymerization drying-type printing inks and coating materials typified by lithographic inks.

DESCRIPTION OF EMBODIMENTS

The curing accelerator for an oxidative polymerization-type unsaturated resin according to the present invention contains a fatty acid manganese salt (A) and a compound (B) represented by general formula (1) below,

[Chem. 2]

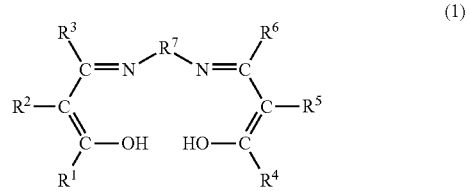

(1)

(wherein $R^1$ and $R^4$ each independently represent a hydrogen atom, a hydrocarbon group, a substituted hydrocarbon group, a hydrocarbonoxy group, a substituted hydrocarbonoxy group, an amino group, or a substituted amino group, $R^2$ and $R^5$ each independently represent a hydrogen atom, a hydrocarbon group, a substituted hydrocarbon group, a hydrocarbonoxy group, a substituted hydrocarbonoxy group, a hydrocarbonoxycarbonyl group, a substituted hydrocarbonoxycarbonyl group, a cyano group, a nitro group, or a halogen atom, $R^3$ and $R^6$ each independently represent a hydrogen atom, a hydrocarbon group, or a substituted hydrocarbon group, and $R^7$ represents a divalent hydrocarbon group or a substituted divalent hydrocarbon group, and wherein $R^1$ and $R^2$ may form a ring, and $R^4$ and $R^5$ may form a ring).

For the fatty acid manganese salt (A), examples include butyric acid, pentanoic acid, octylic acid (2-ethylhexanoic acid), naphthenic acid, neodecanoic acid, isononanoic acid, tung oil acid, linseed oil acid, soybean oil acid, resin acid, and tall oil fatty acid. Particularly, fatty acids having 6 or more carbon atoms are preferred because they can ensure solubility in general-purpose organic solvents, particularly in vegetable oils, mineral spirits, toluene, xylene, etc. that are contained in printing inks and coating materials. No particular limitation is imposed on the upper limit of the number of carbon atoms contained in the fatty acid, and any industrially available fatty acid may be used. From the viewpoint of ease of handling, the number of carbon atoms is preferably 25 or less. The number of carbon atoms contained in the fatty acid includes the number of carbon atoms in the carboxylic acid. One type of fatty acid manganese salt (A) may be used alone, or a combination of two or more types may be used.

The fatty acid manganese salt (A) is preferably a fatty acid manganese salt in which the fatty acid is at least one selected from the group consisting of octylic acid, neodecanoic acid, isononanoic acid, and naphthenic acid because this fatty acid manganese salt can have higher solubility in solvents used as raw materials of printing inks and coating materials.

The fatty acid manganese salt (A) can be obtained by dissolving the fatty acid in the form of water-soluble salt, generally in the form of sodium salt, in water, adding a water-soluble manganese salt to the solution, and subjecting the resultant solution to an ion exchange reaction referred to as double decomposition, followed by washing with water, dehydration, and filtration.

The compound (B) is a compound represented by general formula (1) below,

[Chem. 3]

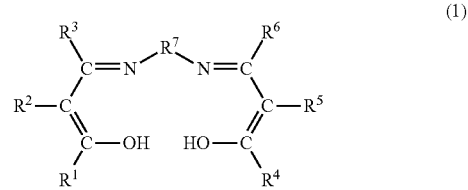

(1)

(wherein $R^1$ and $R^4$ each independently represent a hydrogen atom, a hydrocarbon group, a substituted hydrocarbon group, a hydrocarbonoxy group, a substituted hydrocarbonoxy group, an amino group, or a substituted amino group, $R^2$ and $R^5$ each independently represent a hydrogen atom, a hydrocarbon group, a substituted hydrocarbon group, a hydrocarbonoxy group, a substituted hydrocarbonoxy group, a hydrocarbonoxycarbonyl group, a substituted hydrocarbonoxycarbonyl group, a cyano group, a nitro group, or a halogen atom, $R^3$ and $R^6$ each independently represent a hydrogen atom, a hydrocarbon group, or a substituted hydrocarbon group, and $R^7$ represents a divalent hydrocarbon group or a substituted divalent hydrocarbon group, and wherein $R^1$ and $R^2$ may form a ring, and $R^4$ and $R^5$ may form a ring).

In the present invention, the use of the salen-based compound having the structure represented by general formula (1) allows the drying time (curing time) of a printing ink or a coating material to be shortened, so that excellent curing performance can be achieved. In addition, the salen-based compound can prevent the occurrence of wrinkling and shrinkage on the surface of the coating caused by rapid surface drying of the ink or the coating material.

The substituted hydrocarbonoxy group in general formula (1) above is a hydrocarbonoxy group substituted by a halogen atom, an alkoxy group, an amino group, etc., and specific examples thereof include a trifluoromethoxy group, a 2-t-butyloxyethoxy group, and a 3-diphenylaminopropoxy group.

The substituted amino group is preferably a substituted amino group having 1 to 20 carbon atoms, and specific examples thereof include a methylamino group, an ethylamino group, a propylamino group, a butylamino group, a phenylamino group, a dimethylamino group, a diethylamino group, a dipropylamino group, a dibutylamino group, a methylethylamino group, a methylpropylamino group, a methylbutylamino group, a diphenylamino group, and a dinaphthylamino group.

The hydrocarbonoxycarbonyl group in general formula (1) above is preferably a hydrocarbonoxycarbonyl group having 1 to 20 carbon atoms, and specific examples thereof include a methoxycarbonyl group, an ethoxycarbonyl group, a propoxycarbonyl group, a t-butyloxycarbonyl group, and a phenoxycarbonyl group.

The substituted hydrocarbonoxycarbonyl group in general formula (1) above is a hydrocarbonoxycarbonyl group substituted by a halogen atom, an alkoxy group, an amino group, etc., and specific examples thereof include a trifluoromethoxycarbonyl group, a 2-t-butyloxyethoxycarbonyl group, and a 3-diphenylaminopropoxycarbonyl group.

The halogen atom in general formula (1) above is preferably a chlorine atom, a bromine atom, or an iodine atom and is more preferably a chlorine atom or a bromine atom.

In general formula (1) above, $R^7$ is a divalent hydrocarbon group or a substituted divalent hydrocarbon group, and specific examples thereof include: alkylene groups such as a methylene group, a 1,2-ethylene group, a 1,2-propylene group, a 1,3-propylene group, and a 1,4-butylene group; cycloalkylene groups such as a 1,2-cyclopentylene group and a 1,2-cyclohexylene group; and arylene groups such as a phenylene group and a naphthylene group. $R^7$ is preferably a methylene group, an ethylene group, a 1,2-propylene group, a 1,3-propylene group, or a 1,2-cyclohexylene group and is more preferably a 1,2-propylene group or a 1,3-propylene group, from the viewpoint that the solubility in vegetable oils, mineral spirits, toluene, xylene, etc. contained in printing inks and coating materials is further improved.

Examples of the compound (B) represented by general formula (1) above include N,N'-disalicylideneethylenediamine, N-(3-oxopentylidene)-N'-salicylideneethylenediamine, N,N'-bis(3-methoxysalicylidene)ethylenediamine, N,N'-bis(5-bromosalicylidene)ethylenediamine, N,N'-bis(4-methoxysalicylidene)ethylenediamine, N,N'-bis(4-decyloxysalicylidene)ethylenediamine, N,N'-bissalicylidene-1,2-propanediamine, N,N'-bissalicylidene-1,3-propanediamine, N,N'-bis(3-oxobutylidene)ethylenediamine, N,N'-bis(3-oxobutylidene)-1,3-propanediamine, N,N'-bis(3-oxobutylidene)-1,2-phenylenediamine, N,N'-bis(1-methyl-3-oxobutylidene)ethylenediamine, N,N'-bis(3-oxopentylidene) ethylenediamine, N,N'-bis(3-oxohexylidene) ethylenediamine, N,N'-bis(4-methyl-3-oxopentylidene) ethylenediamine, N,N'-bis(4,4-dimethyl-3-oxopentylidene) ethylenediamine, N,N'-bis(4-phenyl-3-oxobutylidene) ethylenediamine, N,N'-bis(4-trifluoromethyl-3-oxobutylidene)ethylenediamine, N,N'-bis(2-cyano3-oxobutylidene)ethylenediamine, N,N'-bis(2-cyano-3-oxobutylidene)ethylenediamine, N,N'-bis(2-nitro-3-oxobutylidene)ethylenediamine, N,N'-bis(2-carboxylethylidene)ethylenediamine, N,N'-bis[2-(methoxycarbonyl)ethylidene]ethylenediamine, N,N'-bis[2-(dimethylaminocarbonyl)ethylidene]ethylenediamine, N,N'-(1,2-ethylene)-bis(salicylic acid amide), and N,N'-(1,2-ethylene)-bis(malonic acid monomethyl monoamide).

Of these, a compound (b) represented by general formula (2) below is particularly preferred from the viewpoint that the curing time can be further shortened,

[Chem. 4]

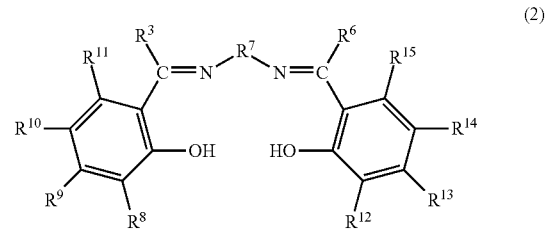

(wherein $R^3$ and $R^6$ each independently represent a hydrogen atom, a hydrocarbon group, or a substituted hydrocarbon group, $R^7$ represents a divalent hydrocarbon group or a substituted divalent hydrocarbon group, and $R^8$ to $R^{15}$ each independently represent a hydrogen atom, a hydrocarbon group, a hydroxyl group, a substituted hydrocarbon group, a hydrocarbonoxy group, a substituted hydrocarbonoxy group, a substituted amino group, a nitro group, or a halogen atom).

$R^3$, $R^6$, and $R^7$ in general formula (2) above are the same as those described for general formula (1) above. Preferably, $R^3$ and $R^6$ are each independently a hydrogen atom or a hydrocarbon group, and $R^7$ is an alkylene group, a cycloalkylene group, or an arylene group. Preferably, $R^8$ to $R^{15}$ are each independently a hydrogen atom, a hydrocarbon group, a halogenated hydrocarbon group, a hydrocarbonoxy group, a substituted amino group, a nitro group, a chlorine atom, or a bromine atom. Particularly preferably, $R^3$ and $R^6$ are each independently a hydrogen atom, a methyl group, or a phenyl group, $R^7$ is a 1,2-ethylene group, a 1,3-propylene group, a 1,2-cyclohexylene group, or a 1,2-phenylene group, and $R^8$ to $R^{15}$ are each independently a hydrogen atom, a methyl group, an ethyl group, a n-propyl group, an iso-propyl group, a n-butyl group, a t-butyl group, a benzyl group, a trifluoromethyl group, a methoxy group, a dimethylamino group, a nitro group, a chlorine atom, or a bromine atom.

The use of a compound in which $R^3$, $R^6$, $R^8$, $R^9$, $R^{10}$, $R^{11}$, $R^{12}$, $R^{13}$, $R^{14}$, and $R^{15}$ are each a hydrogen atom and $R^7$ is a hydrocarbon group having 3 or more carbon atoms is preferred because the solubility in vegetable oils, mineral spirits, toluene, xylene, etc. contained in printing inks and coating materials is further improved.

To further improve the curing performance, the molar mixing ratio of metal manganese in the fatty acid manganese salt (A) to the compound (B), i.e., (A)/(B), is preferably within the range of 0.1 to 20, more preferably within the range of 0.2 to 10, and still more preferably within the range of 0.5 to 5.

In the present invention, a mixture of the fatty acid manganese salt (A) and the compound (B) is used. From the viewpoint of further improving handleability, it is preferable to dilute the mixture with a diluent (C).

The diluent (C) is preferably a compound (solvent) that can dissolve an oxidative polymerization-type unsaturated resin to be cured or a compound (solvent) that is freely miscible with a solvent that can dissolve the resin. Examples of the diluent (C) include: hydrocarbon-based solvents such as toluene, xylene, heptane, hexane, and mineral spirits; alcohol-based solvents such as methanol, ethanol, propanol, and cyclohexanol; ketone-based solvents such as methyl ethyl ketone, methyl isobutyl ketone, and cyclohexanone; ether-based solvents such as propyl ether, methyl cellosolve, cellosolve, butyl cellosolve, and methyl carbitol; vegetable fats and oils such as soybean oil, linseed oil, rape oil, and safflower oil; and fatty acid esters represented by R—COOR' (wherein R is an alkyl group having 5 to 11 carbon atoms, and R' is an alkyl group having 1 to 3 carbon atoms). Only one type of diluent (C) may be used, or a combination of two or more types may be used. Of these, vegetable oils used in printing inks and coating materials that use oxidative polymerization-type unsaturated resins, particularly soybean oil and mineral spirits, are used preferably because homogeneity after an ink or a coating material is formed is high and good storage stability is achieved.

The above R—COOR' is obtained by subjecting a carboxylic acid having 6 to 12 carbon atoms and an alcohol having 1 to 3 carbon atoms to an esterification reaction, and the carbon chains of the carboxylic acid and the alcohol may be linear or may be branched.

Examples of the R—COOR' include caproic acid methyl ester, enanthic acid methyl ester, caprylic acid methyl ester, pelargonic acid methyl ester, capric acid methyl ester, lauric acid methyl ester, caproic acid ethyl ester, enanthic acid ethyl ester, caprylic acid ethyl ester, pelargonic acid ethyl ester, capric acid ethyl ester, lauric acid ethyl ester, caproic acid propyl ester, enanthic acid propyl ester, caprylic acid propyl ester, pelargonic acid propyl ester, capric acid propyl ester, and lauric acid propyl ester. One type of fatty acid ester may be used alone, or a combination of two or more types may be used. Among the above fatty acid esters, caproic acid methyl ester, capric acid methyl ester, and lauric acid methyl ester are preferred because they are less odorous. Lauric acid methyl ester is particularly preferred because it can effectively reduce the viscosity of the curing accelerator of the present invention and simultaneously a reduction in odor can be achieved.

In the present invention, the effect of accelerating curing can be achieved through the combined use of the fatty acid manganese acid salt (A) and the compound (B). In certain applications, an additional compound having the effect of accelerating curing may also be used.

When an additional compound having the effect of accelerating curing is also used, the additional compound having the effect of accelerating curing may be mixed in advance with a mixture containing the fatty acid manganese salt (A), the compound (B), and, if necessary, the diluent (C) to thereby prepare a curing accelerator. Alternatively, the additional compound having the effect of accelerating curing or its solution may by mixed with the mixture containing the fatty acid manganese salt (A), the compound (B), and, if necessary, the diluent (C) when a printing ink or coating material described later is prepared to thereby prepare the curing accelerator.

Examples of the additional compound having the effect of accelerating curing include aluminum chelate compounds (D) and fatty acid metal salts of metals other than cobalt and manganese.

Examples of the aluminum chelate (D) include aluminum diisopropoxide monoethylacetoacetate, aluminum di-n-butoxide monomethylacetoacetate, aluminum di-n-butoxide monoethylacetoacetate, aluminum di-i-butoxide monomethylacetoacetate, aluminum di-sec-butoxide monoethylacetoacetate, aluminum tris(acetylacetonate), aluminum tris (ethylacetoacetonate), and aluminum mono-acetylacetonate bis(ethylacetoacetonate). Of these, aluminum diisopropoxide monoethylacetoacetate is preferred because of its high solubility in solvents used as raw materials of printing inks and coating materials.

Preferably, the content of the aluminum chelate (D) is set such that the amount of aluminum in the aluminum chelate (D) is 0.1 to 20 parts by mass based on 1 part by mass of metal manganese in the fatty acid manganese salt (A). More preferably, the content of the aluminum chelate (D) is set such that the amount of aluminum in the aluminum chelate (D) is 0.25 to 10 parts by mass.

Examples of the fatty acid metal salt of a metal other than cobalt and manganese include fatty acid bismuth salts, fatty acid zirconium salts, fatty acid barium salts, fatty acid calcium salts, fatty acid strontium salts, fatty acid nickel salts, fatty acid copper salts, fatty acid zinc salts, fatty acid cerium salts, and fatty acid vanadium salts. Of these, fatty acid bismuth salts, fatty acid zirconium salts, fatty acid barium salts, fatty acid calcium salts, and fatty acid strontium salts are preferred because better drying properties can be obtained, and fatty acid calcium salts and fatty acid strontium salts are preferred because a coating film that dries to touch quickly can be obtained. Preferably, the fatty acid used has 6 or more carbon atoms from the viewpoint that high solubility in solvents is obtained.

An oxidative polymerization-type unsaturated resin described later is oxidized by oxygen in air, and its unsaturated bonds are polymerized, whereby the resin is cured. Generally, the fatty acid manganese salt causes a composition such as a printing ink or a coating material containing the oxidative polymerization-type unsaturated resin to capture oxygen in air to thereby cure the oxidative polymerization-type unsaturated resin. The fatty acid bismuth salts, fatty acid zirconium salts, fatty acid barium salts, fatty acid calcium salts, and fatty acid strontium salts described above facilitate the capture of oxygen in air caused by the fatty acid manganese salt, and this probably improves the curability of the oxidative polymerization-type unsaturated resin.

The above-described fatty acid bismuth salts, fatty acid zirconium salts, fatty acid barium salts, fatty acid calcium salts, and fatty acid strontium salts themselves adsorb to a pigment component in a coating material or a printing ink. This prevents adsorption of the fatty acid manganese salt (A) to the pigment component and also provides the effect of improving curability.

The fatty acid bismuth salts are bismuth salts of fatty acids, and examples of the fatty acids include octylic acid, naphthenic acid, neodecanoic acid, isononanoic acid, tung oil acid, linseed oil acid, soybean oil acid, resin acid, and tall oil fatty acid.

The fatty acid zirconium salts are zirconium salts of fatty acids, and examples of the fatty acids include octylic acid, naphthenic acid, neodecanoic acid, isononanoic acid, tung oil acid, linseed oil acid, soybean oil acid, resin acid, and tall oil fatty acid.

The fatty acid barium salts are barium salts of fatty acids, and examples of the fatty acids include octylic acid, naphthenic acid, neodecanoic acid, isononanoic acid, tung oil acid, linseed oil acid, soybean oil acid, resin acid, and tall oil fatty acid.

The fatty acid calcium salts are calcium salts of fatty acids, and examples of the fatty acids include octylic acid, naphthenic acid, neodecanoic acid, isononanoic acid, tung oil acid, linseed oil acid, soybean oil acid, resin acid, and tall oil fatty acid.

The fatty acid strontium salts are strontium salts of fatty acids, and examples of the fatty acids include octylic acid, naphthenic acid, neodecanoic acid, isononanoic acid, tung oil acid, linseed oil acid, soybean oil acid, resin acid, and tall oil fatty acid.

When the fatty acid metal salt used in combination with the fatty acid manganese salt (A) is at least one fatty acid metal salt selected from the group consisting of fatty acid bismuth salts, fatty acid zirconium salts, and fatty acid barium salts, it is preferable that the metal salt is contained such that the amount of the metal in the metal salt is 1 to 100 parts by mass based on 1 part by mass of metal manganese in the fatty acid manganese salt (A), and it is more preferable that the metal salt is contained such that the amount of the metal in the metal salt is 3 to 40 parts by mass.

When the fatty acid metal salt used in combination is a fatty acid calcium salt or a fatty acid strontium salt, it is preferable that the amount of the fatty acid metal salt is set such that the amount of the metal in the fatty acid calcium or strontium salt is 1 to 100 parts by mass based on 1 part by mass of metal manganese in the fatty acid manganese salt (A).

The fatty acid bismuth, zirconium, barium, calcium, and strontium salts (hereinafter referred to as fatty acid metal salts) used may be commercially available products or may be produced as needed. For example, to produce a fatty acid metal salt, one of bismuth, zirconium, barium, strontium (hereinafter referred to as metals), and their compounds such as their hydrates, hydroxides, and carbonates (hereinafter referred to as metal compounds) is added to one of the above-described fatty acids, and the mixture is stirred in a high-temperature atmosphere to allow the components to react. The temperature during the reaction is generally 40° C. to 200° C. and preferably 80° C. to 150° C. The reaction time is generally 1 to 10 hours and preferably 1 to 5 hours. The molar ratio of the fatty acid used to the metal or metal compound used (the fatty acid/the metal or metal compound is generally within the range of 1.0 to 4.0 and preferably within the range of 1.5 to 3.5.

The fatty acid metal salt can also be obtained by dissolving the fatty acid in the form of water-soluble salt, generally in the form of sodium salt, in water, adding a water-soluble metal salt to the solution, and subjecting the resultant solution to an ion exchange reaction referred to as double decomposition, followed by washing with water, dehydration, and filtration.

The printing ink of the present invention is obtained by mixing an oxidative polymerization-type unsaturated resin, the curing accelerator for the oxidative polymerization-type unsaturated resin according to the present invention, and a colorant. Generally, the printing ink includes a varnish (a solvent solution of the oxidative polymerization-type unsaturated resin) which is a binder resin, a colorant which is a pigment or dye, and a diluent for controlling the viscosity and drying properties of the printing ink. The oxidative polymerization-type unsaturated resin used in the varnish can be any combination of rosin-modified phenolic resins, polyesters, alkyd resins, petroleum resins, PET, polystyrene, and polyvinyl chloride. If necessary, a surface modifier such as a polyethylene wax, a Fluon wax, or a silicon compound may also be used, and a drying retarder such as hydroquinone or t-butylhydroquinone may also be used in order to control the rate of oxidative polymerization or the surface skinning properties of the varnish composition.

When a pigment, a dye, etc. serving as the colorant is added to the varnish, an oxidative polymerization drying-type printing ink that is air-dried with oxygen in air can be produced. This printing ink may be applicable to lithographic offset inks, lithographic waterless inks, letterpress inks, etc. When the printing ink is applied to a lithographic offset ink, various surfactants may be added in order to control its emulsification performance.

When the oxidative polymerization drying-type printing ink of the present invention is used, at least one selected from the group consisting of drying oils, modified products of drying oils, semidrying oils, and modified products of semidrying oils (hereinafter referred to as drying oils etc.) is generally used for the ink in an amount within the range of 5 to 40% by mass.

No particular limitation is imposed on the drying oils etc. so long as they are polymerized in the presence of oxygen. Examples of the usable drying oils etc. include linseed oil, soybean oil, tung oil, castor oil, tall oil, safflower oil, Chinese wood oil, palm oil, perilla oil, hempseed oil, mustard oil, rice bran oil, oiticica oil, persic oil, lumbang oil, daikon radish seed oil, chaulmoogra oil, niger seed oil, grape seed oil, almond oil, grape hip oil, sesame oil, corn oil, rapeseed oil (rape oil), sunflower oil, cottonseed oil, avocado oil (oleic acid 69%), olive oil, jojoba oil (containing an unsaturated fatty acid and an unsaturated alcohol), peanut oil, (kapok oil, camellia oil, tea seed oil), and modified products thereof.

One exemplary method of producing the printing ink of the present invention includes milling the varnish, the colorant, the dilution solvent, the curing accelerator for the oxidative polymerization-type unsaturated resin according to the present invention, and, if necessary, other additives such as a wax using a mill such as a three-roll mill. Preferably, in this case, the curing accelerator of the present invention is diluted with any of the above-described fatty acid esters and vegetable oils.

The amount of the curing accelerator for the oxidative polymerization-type unsaturated resin according to the present invention in the printing ink is preferably within the range of 0.001 to 1 part by mass, in terms of manganese atoms, based on 100 parts by mass of the varnish in the printing ink and more preferably within the range of 0.01 to 0.5 parts by mass because a short drying time and prevention of skinning can be achieved simultaneously.

The coating material of the present invention is characterized by including an oxidative polymerization-type unsaturated resin and the curing accelerator for the oxidative polymerization-type unsaturated resin according to the present invention.

Examples of the oxidative polymerization-type unsaturated resin include oxidative polymerization curing-type alkyd resins, oxidative polymerization curing-type urethane resins, and oxidative polymerization curing-type modified epoxy resins. Particularly, in the present invention, an oxidative polymerization curing-type alkyd resin is preferably used because it has a low cost, is easily available, and allows the coating material to have good drying properties (high practicability).

Examples of the oxidative polymerization curing-type alkyd resin include ester-based resins composed of a polybasic acid component, a polyhydric alcohol component, and an oil fatty acid as main components.

A dibasic acid such as phthalic anhydride, isophthalic acid, terephthalic acid, tetrahydrophthalic anhydride, hexahydrophthalic anhydride, succinic acid, fumaric acid, adipic acid, sebacic acid, or maleic anhydride or a lower-alkyl ester of any of these acids is mainly used as the polybasic acid component. If necessary, trivalent and higher polybasic acids such as trimellitic anhydride, methylcyclohexene tricarboxylic acid, and pyromellitic anhydride may be further used, and sulfophthalic acid, sulfoisophthalic acid, ammonium salts thereof, sodium salts thereof, and lower alkyl esters thereof may be further used. In addition, a monobasic acid such as benzoic acid, crotonic acid, or p-t-butylbenzoic acid may also be used as an acid component for the purpose of controlling a molecular weight etc.

Examples of the polyhydric alcohol component include dihydric alcohols such as ethylene glycol, diethylene glycol, propylene glycol, 1,4-butanediol, neopentyl glycol, 3-methylpentanediol, 1,4-hexanediol, and 1,6-hexanediol. If necessary, a trihydric or higher polyhydric alcohol such as glycerin, trimethylolethane, trimethylolpropane, or pentaerythritol, a polyhydric alcohol having a polyoxyethylene group, etc. may also be used. One type of polyhydric alcohol component may be used alone, or a mixture of two or more types may be used. These acid and alcohol components may be partially replaced with an oxyacid component such as dimethylolpropionic acid, oxypivalic acid, paraoxybenzoic acid, a lower alkyl ester of any of these acids, or a lactone such as ε-caprolactone.

Examples of the oil fatty acid include coconut oil fatty acid, soybean oil fatty acid, linseed oil fatty acid, safflower oil fatty acid, tall oil fatty acid, dehydrated castor oil fatty acid, and tung oil fatty acid.

It is also possible to use an epoxy-modified alkyd resin prepared by partial esterification of an epoxy compound used as part of the alcohol component, a maleinized alkyd resin prepared by introducing maleic anhydride into an alkyd resin, a grafted alkyd resin prepared by addition of a maleinized alkyd resin and a hydroxyl group-containing alkyd resin, a vinyl-modified alkyd resin prepared by graft polymerization of a vinyl monomer such as styrene or (meth)acrylate to an alkyd resin, etc.

Moreover, it is possible to utilize a polyester resin prepared using, as a main component, terephthalic acid regenerated from, for example, polyethylene terephthalate recovered for recycling of resources (for example, PET bottles), industrial waste polyethylene terephthalate, and wastes generated during production of polyester products (films, fibers, automobile components, electronic components, etc.) such as products of polyethylene terephthalate and polybutylene terephthalate produced using terephthalic acid as a main component (the above polyester resin is hereinafter abbreviated as "regenerated PES"). Specifically, the regenerated PES is dissolved in a mixture of the above-described alcohol component and polybasic acid component, depolymerized, and subjected to esterification to thereby obtain an alkyd resin. This alkyd resin may also be used. In addition, a maleinized alkyd resin prepared by reacting the above alkyd resin with maleic anhydride, a modified alkyd resin prepared by reacting the above alkyd resin with an acid anhydride having no ethylenically unsaturated group, etc. may be used.

Preferably, the coating material of the present invention further contains an organic solvent. Examples of the usable organic solvent include the above-described hydrocarbon-based solvents, alcohol-based solvents, ketone-based solvents, and ether-based solvents.

The coating material of the present invention may further contain, in addition to the above-described components, a colorant such as a pigment and various additives for coating materials, such as a pigment dispersant, a surface modifier, an ultraviolet absorber, an antifoaming agent, a thickener, and an anti-settling agent, as needed.

No particular limitation is imposed on the amount of the curing accelerator of the present invention mixed with the coating material. Preferably, the total mass of the metal manganese components is within the range of 0.001 to 1.0 parts by mass based on 100 parts by mass of the oxidative polymerization-type unsaturated resin.

The coating material of the present invention described above in detail can be applied to a substrate to be coated, and dried and cured according to a routine procedure to thereby obtain a coating film. Examples of the substrate (the substrate to be coated) that can be coated with the coating material of the present invention include steel substrates. Examples of the drying conditions (curing conditions) after the application include air drying. The coating material of the present invention can exhibit superior curability even when the thickness of the coating film is large and is therefore particularly useful as a coating material for thick coating. Specifically, the thickness of the cured coating film can be within the range of 1 to 500 μm. Therefore, the coating material of the present invention is useful as a coating material for construction.

EXAMPLES

The present invention will next be described in more detail by way of specific examples. In the examples, "part" and "%" are based on mass unless otherwise specified.

Method of Testing Drying Properties of Coating Material

A prepared coating material was applied to a glass plate using a 3-mil applicator, and then a test was performed using a drying time recorder ("Model No. 404" manufactured by Taiyu Kizai Co., Ltd.). The measurement was performed in a constant temperature-humidity chamber (25° C., 50% RH). A scratch is formed on the coating material by a needle of the drying time recorder at the beginning of drying of the coating material, but no scratch is formed after the coating material has dried completely. Therefore, the drying time of the coating material is defined as the time from the application of the coating material to the glass plate until no scratch is formed on the coating material.

Method of Testing Drying Properties of Printing Ink

A prepared printing ink was applied to a glass plate using a 1.5-mil applicator, and then a test was performed using a drying time recorder ("Model No. 404" manufactured by Taiyu Kizai Co., Ltd.). The measurement was performed in a constant temperature-humidity chamber (25° C., 50% RH). A scratch is formed on the ink by a needle of the drying time recorder at the beginning of drying of the ink, but no scratch is formed after the ink has dried completely. Therefore, the drying time of the ink is defined as the time from the application of the ink to the glass plate until no scratch is formed on the ink.

Examples 1 to 8

Preparation of Curing Accelerators

Manganese octylate was used as the fatty acid manganese salt. N,N'-bissalicylidene-1,2-propanediamine or N,N'-bissalicylidene-1,3-propanediamine was used as the compound (B). A diluent was mixed at a ratio shown in the following table to thereby obtain one of curing accelerators 1 to 8 of the present invention.

TABLE 1

| | EXAMPLE | | | | | | | |
|---|---|---|---|---|---|---|---|---|
| | 1 | 2 | 3 | 4 | 5 | 6 | 7 | 8 |
| CURING ACCELERATOR | 1 | 2 | 3 | 4 | 5 | 6 | 7 | 8 |
| MANGANESE OCTYLATE | 10 | 10 | 10 | 10 | 10 | 10 | 1 | 1 |
| CALCIUM OCTYLATE | | | | | | | 50 | |
| ZIRCONIUM OCTYLATE | | | | | | | | 25 |
| N,N'-BISSALICYLIDENE-1,2-PROPANEDIAMINE | 8.2 | 4.1 | 2.0 | 1.0 | | | 0.7 | 0.4 |
| N,N'-BISSALICYLIDENE-1,3-PROPANEDIAMINE | | | | | 8.2 | 4.1 | | |
| MINERAL SPIRITS | | 10 | 10 | | 10 | | 50 | 25 |
| SOYBEAN OIL | 10 | | | 10 | | 10 | 2 | 2 |

Examples 9 to 18

Preparation and Evaluation of Coating Materials 1,960 g of a titanium white pigment ("JR-701" manufactured by Tayca Corporation), 3,340 g of a resin for a coating material "BECKOSOL P-470-70" (manufactured by DIC Corporation, an alkyd-based resin having an unsaturated fatty acid group in its molecule), 280 g of mineral spirits, and 20 g of an anti-skinning agent (methyl ethyl ketoxime) were kneaded using a three-roll mill to obtain a mixture. One of the curing accelerators in the above table was added to 40 g of the above-obtained mixture at a ratio shown in the following table (the ratio of the metal manganese component with respect to 100 parts of the nonvolatile resin component) to prepare a coating material.

Each of the obtained coating materials was subjected to a drying property test. The results are shown below.

TABLE 2

| | EXAMPLE | | | | | | | | | |
|---|---|---|---|---|---|---|---|---|---|---|
| | 9 | 10 | 11 | 12 | 13 | 14 | 15 | 16 | 17 | 18 |
| CURING ACCELERATOR | 1 | 1 | 1 | 2 | 3 | 4 | 5 | 6 | 7 | 8 |
| MANGANESE % | 0.06 | 0.03 | 0.01 | 0.06 | 0.06 | 0.06 | 0.005 | 0.06 | 0.005 | 0.005 |
| DRYING TIME (HOURS) | 4.8 | 5.8 | 5.5 | 4.7 | 6.0 | 6.2 | 6.8 | 4.9 | 5.6 | 6.2 |

Examples 19 to 22

Preparation and Evaluation of Inks (Preparation of Varnish)

40 Parts by mass of a rosin-modified phenolic resin ("BECKACITE F8301" manufactured by DIC Corporation), 50 parts by mass of soybean oil ("Soybean Salad Oil (S)" manufactured by The Nisshin OilliO Group, Ltd.), 10 parts by mass of soybean oil fatty acid methyl ester ("TOEOL 3120" manufactured by TOEI CHEMICAL Co., Ltd.), and 0.3 parts by mass of aluminum chelate ("Alumichelate" manufactured by Hope Chemical Co., Ltd.) were heated at 210° C. for 1 hour to prepare a varnish.

(Preparation of Inks for Evaluation)

Components shown below and one of the curing accelerators 1 to 4 obtained in EXAMPLES 1 to 4 were used in the following amounts and then milled using a three-roll mill to prepare a printing ink for evaluation. A phthalocyanine blue pigment used was "FASTOGEN Blue TGR-L" manufactured by DIC Corporation, and soybean oil used was "Soybean Salad Oil (S)" manufactured by The Nisshin OilliO Group, Ltd.

| | |
|---|---|
| Varnish | 65.5 parts by mass |
| Phthalocyanine blue pigment | 16 parts by mass |
| Soybean oil | 17 parts by mass |
| Curing accelerator | parts by mass shown in a table below |

Each of the obtained printing ink was subjected to a drying property test. The results are shown below.

TABLE 3

| EXAMPLE | 19 | 20 | 21 | 22 |
|---|---|---|---|---|
| CURING ACCELERATOR | 1 | 2 | 3 | 4 |
| AMOUNT OF CURING ACCELERATOR (PARTS BY MASS) | 0.25 | 2 | 0.5 | 1 |
| DRYING TIME (HOURS) | 4.2 | 4.8 | 5.0 | 5.2 |

For the purpose of demonstrating the average level of the performance of conventional curing accelerators, curing accelerators produced in COMPARATIVE EXAMPLES 1 to 3 below were added at ratios shown in COMPARATIVE EXAMPLES 4 to 6 (the ratios of a metal cobalt or manganese component with respect to 100 parts of a nonvolatile resin component) to obtain coating materials, and the drying time of each coating material was measured.

Comparative Example 1

12 Parts of cobalt naphthenate and 38 parts of zirconium octylate were dissolved in 50 parts of mineral spirits to obtain a control curing accelerator 1'. This curing accelerator was produced for the purpose of demonstrating the average level of the performance of a conventional metallic soap containing a cobalt metallic soap.

Comparative Example 2

56 Parts of manganese naphthenate and 18 parts of 2,2'-bipyridyl were dissolved in 26 parts of mineral spirits to obtain a control curing accelerator 2'.

Comparative Example 3

18 Parts of manganese octylate, 4 parts of 2-[(2-dimethylaminoethyl)methylamino]ethanol, 50 parts of bismuth octylate, 13 parts of mineral spirits, and 15 parts of soybean oil were dissolved to obtain a control curing accelerator 3'.

Comparative Example 4

A control coating material 1' was obtained in the same manner as in EXAMPLE 9 except that the control curing accelerator 1' was added instead of the curing accelerator 1 such that the ratio of the metal cobalt component with respect to 100 parts of the nonvolatile resin component was 0.06%. The drying time was measured as in EXAMPLE 9, and the results are shown in a table below.

Comparative Example 5

A control coating material 2' was obtained in the same manner as in EXAMPLE 9 except that the control curing accelerator 2' was added instead of the curing accelerator 1 such that the ratio of the metal manganese component with respect to 100 parts of the nonvolatile resin component was 0.06%. The drying time was measured as in EXAMPLE 9, and the results are shown in the table below.

Comparative Example 6

A control coating material 3' was obtained in the same manner as in EXAMPLE 9 except that the control curing accelerator 3' was added instead of the curing accelerator 1 such that the ratio of the metal manganese component with respect to 100 parts of the nonvolatile resin component was 0.06%. The drying time was measured as in EXAMPLE 9, and the results are shown in the table below.

TABLE 4

| COMPARATIVE EXAMPLE | 4 | 5 | 6 |
|---|---|---|---|
| CONTROL CURING ACCELERATOR | 1' | 2' | 3' |
| DRYING TIME (HOURS) | 12.8 | 11.7 | 9.1 |

Comparative Example 7

A control coating material was produced in the same manner as in EXAMPLE 9 except that calcium octylate (Ca-OCTOATE 4% manufactured by DIC Corporation) was added instead of the curing accelerator 1 such that the ratio of the metal calcium component with respect to 100 parts of the nonvolatile resin component was 0.2%. The drying time was measured as in EXAMPLE 9, but the coating material did not dry in 24 hours.

Comparative Example 8

A control coating material was produced in the same manner as in EXAMPLE 9 except that zirconium octylate (12% Zr-OCTOATE manufactured by DIC Corporation) was added instead of the curing accelerator 1 such that the ratio of the metal zirconium component with respect to 100 parts of the nonvolatile resin component was 0.2%. The drying time was measured as in EXAMPLE 9, but the coating material did not dry in 24 hours.

For the purpose of demonstrating the average level of the performance of a curing accelerator in a printing ink, curing accelerators 4' and 5' prepared in COMPARATIVE EXAMPLES 9 to 10 were used to prepare inks for evaluation in the same manner as in EXAMPLE 19, and then the drying time of each of the obtained inks was measured. The results are shown in a table.

Comparative Example 9

31 Parts of manganese octylate and 14 parts of 2,2'-bipyridyl were dissolved in 55 parts of methyl oleate to thereby obtain a control curing accelerator 4'.

Comparative Example 10

31 Parts of manganese octylate was dissolved in 69 parts of methyl oleate to thereby obtain a control curing accelerator 5'.

TABLE 5

| COMPARATIVE EXAMPLE | 9 | 10 |
|---|---|---|
| CONTROL CURING ACCELERATOR | 4' | 5' |
| DRYING TIME (HOURS) | 9.3 | 9.5 |

Comparative Example 11

A curing accelerator was prepared using manganese sulfate as the manganese salt and N,N'-bissalicylidene-1,2-propanediamine as the compound (B) in the same manner as in EXAMPLE 1. However, the solubility of the curing accelerator was poor, and a precipitate was deposited.

The invention claimed is:
1. A curing accelerator for an oxidative polymerizable unsaturated resin, the curing accelerator comprising a fatty acid manganese salt (A) and a compound (B) represented by general formula (1) below,

[Chem. 1]

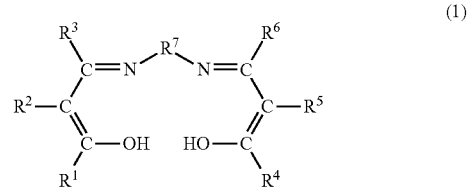

(1)

(wherein $R^1$ and $R^4$ each independently represent a hydrogen atom, a hydrocarbon group, a hydrocarbonoxy group, an amino group, $R^2$ and $R^5$ each independently represent a hydrogen atom, a hydrocarbon group, a hydrocarbonoxy group, a hydrocarbonoxycarbonyl group, a cyano group, a nitro group, or a halogen atom, $R^3$ and $R^6$ each independently represent a hydrogen atom, or a hydrocarbon group, and $R^7$ represents a divalent hydrocarbon group, and wherein $R^1$ and $R^2$ may form a ring, and $R^4$ and $R^5$ may form a ring).

2. The curing accelerator for an oxidative polymerizable unsaturated resin according to claim 1, wherein the compound (B) is a compound (b) represented by general formula (2) below,

[Chem. 2]

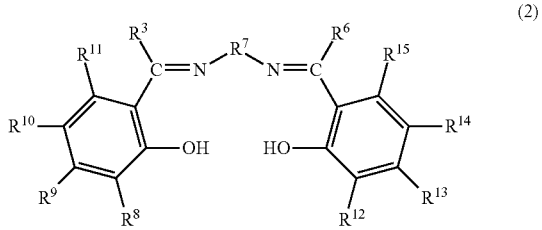

(2)

(wherein $R^3$ and $R^6$ each independently represent a hydrogen atom, or a hydrocarbon group, $R^7$ represents a divalent hydrocarbon group, and $R^8$ to $R^{15}$ each independently represent a hydrogen atom, a hydrocarbon group, a hydroxyl group, a hydrocarbonoxy group, a nitro group, or a halogen atom).

3. The curing accelerator for an oxidative polymerizable unsaturated resin according to claim 2, wherein $R^3$, $R^6$, $R^8$, $R^9$, $R^{10}$, $R^{11}$, $R^{12}$, $R^{13}$, $R^{14}$, and $R^{15}$ in the compound (b) represented by general formula (2) above are each a hydrogen atom, and $R^7$ in the compound (b) is a hydrocarbon group having 3 or more carbon atoms.

4. The curing accelerator for an oxidative polymerizable unsaturated resin according to claim 1, wherein a fatty acid in the fatty acid manganese salt (A) is octylic acid, neodecanoic acid, isononanoic acid, or naphthenic acid.

5. The curing accelerator for an oxidative polymerizable unsaturated resin according to claim 1, wherein the amount of metal manganese in the fatty acid manganese salt (A) is within the range of 0.1 to 20 moles with respect to 1 mole of the compound (B).

6. The curing accelerator for an oxidative polymerizable unsaturated resin according to claim 1, further comprising a diluent (C).

7. The curing accelerator for an oxidative polymerizable unsaturated resin according to claim 1, further comprising at least one fatty acid metal salt (E) selected from the group consisting of fatty acid bismuth salts, fatty acid zirconium salts, fatty acid barium salts, fatty acid calcium salts, and fatty acid strontium salts.

8. A printing ink comprising an oxidative polymerizable unsaturated resin and the curing accelerator for the oxidative polymerizable unsaturated resin according to claim 1.

9. A coating material comprising an oxidative polymerizable unsaturated resin and the curing accelerator for the oxidative polymerizable unsaturated resin according to claim 1.

10. The curing accelerator for an oxidative polymerizable unsaturated resin according to claim 2, wherein a fatty acid in the fatty acid manganese salt (A) is octylic acid, neodecanoic acid, isononanoic acid, or naphthenic acid.

11. The curing accelerator for an oxidative polymerizable unsaturated resin according to claim 3, wherein a fatty acid in the fatty acid manganese salt (A) is octylic acid, neodecanoic acid, isononanoic acid, or naphthenic acid.

12. The curing accelerator for an oxidative polymerizable unsaturated resin according to claim 2, wherein the amount of metal manganese in the fatty acid manganese salt (A) is within the range of 0.1 to 20 moles with respect to 1 mole of the compound (B).

13. The curing accelerator for an oxidative polymerizable unsaturated resin according to claim 3, wherein the amount of metal manganese in the fatty acid manganese salt (A) is within the range of 0.1 to 20 moles with respect to 1 mole of the compound (B).

14. The curing accelerator for an oxidative polymerizable unsaturated resin according to claim 2, further comprising a diluent (C).

15. The curing accelerator for an oxidative polymerizable unsaturated resin according to claim 3, further comprising a diluent (C).

16. The curing accelerator for an oxidative polymerizable unsaturated resin according to claim 2, further comprising at least one fatty acid metal salt (E) selected from the group consisting of fatty acid bismuth salts, fatty acid zirconium salts, fatty acid barium salts, fatty acid calcium salts, and fatty acid strontium salts.

17. The curing accelerator for an oxidative polymerizable unsaturated resin according to claim 3, further comprising at least one fatty acid metal salt (E) selected from the group consisting of fatty acid bismuth salts, fatty acid zirconium salts, fatty acid barium salts, fatty acid calcium salts, and fatty acid strontium salts.

18. A printing ink comprising an oxidative polymerizable unsaturated resin and the curing accelerator for the oxidative polymerizable unsaturated resin according to claim 2.

19. A printing ink comprising an oxidative polymerizable unsaturated resin and the curing accelerator for the oxidative polymerizable unsaturated resin according to claim 3.

20. A coating material comprising an oxidative polymerizable unsaturated resin and the curing accelerator for the oxidative polymerizable unsaturated resin according to claim 2.

21. The curing accelerator for an oxidative polymerizable unsaturated resin according to claim 4, wherein the octylic acid is 2-ethylhexanoic acid.

22. The curing accelerator for an oxidative polymerizable unsaturated resin according to claim 10, wherein the octylic acid is 2-ethylhexanoic acid.

23. The curing accelerator for an oxidative polymerizable unsaturated resin according to claim 11, wherein the octylic acid is 2-ethylhexanoic acid.

* * * * *